United States Patent [19]
Deveau

[11] Patent Number: 5,117,397
[45] Date of Patent: May 26, 1992

[54] PLANAR WAVEFRONT SIMULATOR

[75] Inventor: David M. Deveau, Portsmouth, R.I.

[73] Assignee: The United States of America as represented by the Secretary of the Navy, Washington, D.C.

[21] Appl. No.: 771,661

[22] Filed: Oct. 4, 1991

[51] Int. Cl.$^5$ .............................................. H04B 17/00
[52] U.S. Cl. ...................................................... 367/13
[58] Field of Search .......................... 367/13; 73/1 DV

[56] References Cited

U.S. PATENT DOCUMENTS 4,972,381 11/1990 Mitchell et al. ........................ 367/13

Primary Examiner—Daniel T. Pihulic
Attorney, Agent, or Firm—Michael J. McGowan; Prithvi C. Lall; Michael F. Oglo

[57] ABSTRACT

An apparatus is provided for simulating a planar wavefront propagating at a known frequency and incident upon an imaginary linear array of receiving elements at a known angle of incidence. A master clock generates a clock signal at a selected frequency. A frequency divisor and time delay divisor are generated based upon the master clock's frequency, spacing between the receiving elements, frequency of propagation, angle of incidence, and wavefront propagation speed. Frequency generation counters are provided such that each is connected to receive the master clock signal and the frequency divisor. A time delay counter is connected to receive the master clock signal and the time delay divisor to generate a pulse every T seconds where T is the time difference associated with receiving the planar wavefront at any two adjacent receiving elements. A delay enable shift register is connected to the time delay counter to receive the generated pulse every T seconds. Enable lines of the shift register are successively set HIGH in response to the generated pulse. Each of the enable lines is connected to a corresponding one of the frequency generation counters. In this way, a signal is generated at the known frequency of propagation at each one of the corresponding frequency generation counters when its enable line is set HIGH.

6 Claims, 2 Drawing Sheets

PLANAR WAVEFRONT SIMULATOR

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to signal simulation, and more particularly to an apparatus for simulating a planar wavefront as it would be received by an imaginary linear array of equally spaced receiving elements.

(2) Description of the Prior Art

Underwater acoustical measurement systems often use a vertical line of equally spaced sensors to receive acoustical signals. This line of sensors is called an array. It is assumed that the acoustical signals are generated at a distance from the array such that they can be considered planar upon reaching the array. These planar acoustical signals are called wavefronts. To increase the array's ability to distinguish between the signal and correlated noise, the sensor outputs are added together to form a spatial filter, otherwise known as an acoustical beam.

Pictorially, the beam forms a cone which starts at the array's center and expands along an axis which is perpendicular to the array's center. Performing in the same manner as a bandpass filter, its electrical counterpart, the cone accepts wavefronts that fall within the cone while ignoring wavefronts outside the cone. This increases the gain or strength of wavefronts (i.e., signals) within the cone relative to signals outside the cone.

A beam whose axis is the same as the array's perpendicular axis can be mathematically represented by stating that the signal outputs from each sensor are "in phase". Two or more signals, of the same frequency, are considered to be "in phase" when they pass through their maximum and minimum points at the same instant. Signals are "out of phase" when they pass through their maximum and minimum points at different points in time. Thus sensor outputs are in phase when the wavefront is parallel to the array. However, if the wavefront arrives at the some angle relative to the array's axis, it is not entirely received by the cone and the array's signal output is reduced. The output is reduced because it takes longer for the signal to travel to each sensor. Therefore, when the output signals from the sensors are added together, the signals are not in phase and the signal strength is reduced.

To correct this situation, a beamformer is usually connected to receive the outputs of the sensors in the array. The beamformer introduces time delays which correlate to phase angles in the mathematical frequency domain. These time delays counteract the delays created by the time it takes the angled wavefront to travel to each sensor thereby forcing all the sensor outputs back in phase. In this way, the signals have their maximums and minimums occurring at the same instance in time so they can be added together and produce the same combined output strength as if the wavefront was parallel to the array's axis and centered at the same depth. This is pictorially interpreted as if the array's beam or cone was steered in the direction of the incoming acoustical wavefront to completely capture the wavefront.

The problem with beamforming systems is that in order to test their performance, a known electrical signal must be injected into the sensors' input amplifiers to simulate an acoustic wavefront. This is straightforward for the parallel wavefront but complications arise when precise incremental delays must be introduced for each sensor's amplifier to simulate a wavefront at some angle to the array's axis.

While discrete components do exist to implement delays in signal lines, these components are configured to create a single delay that cannot be adjusted. Thus, if an array can receive any signal over an angular range of 180°, there must be 180 delay line components per sensor channel to simulate all possible wavefronts with one degree of phase accuracy. This is not practical or cost effective.

SUMMARY OF THE INVENTION

Accordingly, it is an object of the present invention to provide an apparatus that simulates a planar wavefront which ca be used to test the performance of beamforming measurement systems.

It is a further object of the present invention to provide an apparatus that can simulate a planar wavefront as it would be received by an imaginary linear array of equally spaced receiving elements regardless of the planar wavefront's angle of incidence.

Another object of the present invention is to provide an apparatus that can simulate a planar wavefront and can operate over a wide range of frequencies for a variety of angles of incidence.

Still another object of the present invention is to provide an apparatus that can simulate a planar wavefront as it would be received by an imaginary linear array of equally spaced receiving elements regardless of the spacing between the receiving elements.

Yet another object of the present invention is to provide an apparatus that can simulate a planar wavefront with a minimum number of components.

Other objects and advantages of the present invention will become more obvious hereinafter in the specification and drawings.

In accordance with the present invention, an apparatus is provided for simulating a planar wavefront as it would be received by an imaginary linear array of M equally spaced receiving elements sensitive to the wavefront. The wavefront is simulated to propagate at a known frequency through a medium and to be incident upon the imaginary linear array at a known angle of incidence. A master clock generates a clock signal at a selected frequency. A frequency divisor and time delay divisor are generated based upon the selected frequency of the master clock, the spacing between the receiving elements, the known frequency of propagation, the known angle of incidence, and wavefront propagation speed in the medium. A plurality of M frequency generation counters are provided such that each is connected to receive the master clock signal and the frequency divisor. A time delay counter is connected to receive the master clock signal and the time delay divisor to generate a pulse every T seconds. The value of T is equal to the time difference associated with receiving the planar wavefront at any two adjacent receiving elements of the imaginary linear array for the known angle of incidence. A delay enable shift register is connected to the time delay counter to receive the generated pulse every T seconds. The shift register has M enable lines as output lines wherein each successive one of the M enable lines is set HIGH in response to the generated pulse. Each one of the M enable lines is connected to a corresponding one of the M frequency generation counters In this way, a signal is generated at the known frequency of propagation at each one of the corresponding M frequency generation counters when its enable line is set HIGH. The generated signal is based on the selected frequency of the master clock and the frequency divisor.

BRIEF DESCRIPTION OF THE DRAWING(s)

FIG 1 is a diagrammatic pictorial detailing of a planar wavefront incident upon a linear array of sensors at a specified angle; and FIG. 2 is a block diagram of the planar wavefront simulator according to the present invention.

DESCRIPTION OF THE PREFERRED EMBODIMENT(s)

Figure 1:
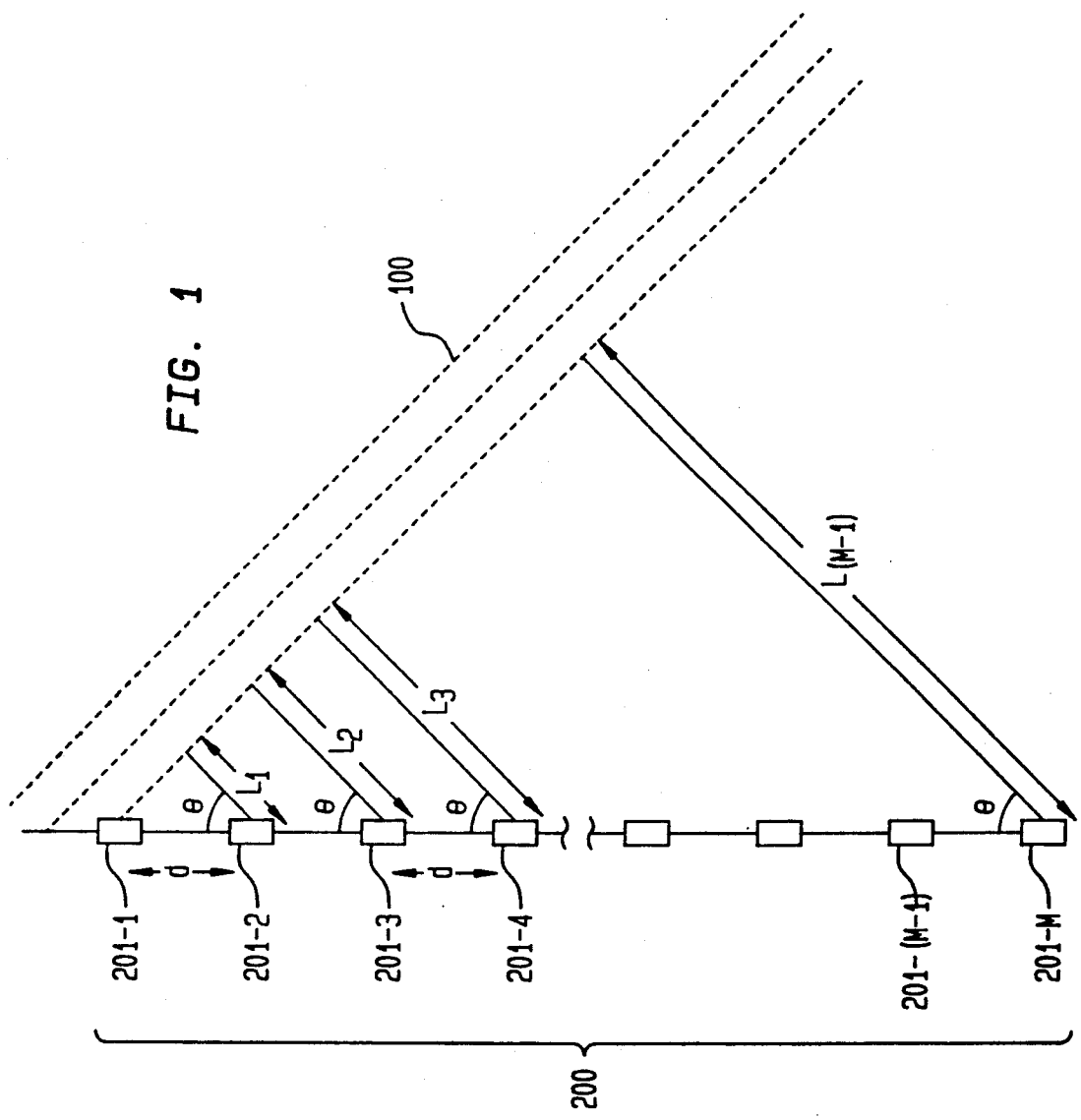

In order to better understand the planar wavefront simulator of the present invention, the relationship between a planar wavefront and an imaginary linear sensor array will now be described with reference to FIG. 1. As shown in FIG. 1, a planar wavefront is represented by the dotted lines 100 and is incident upon an imaginary linear sensor array 200 having equally spaced apart sensors 201-1, 201-2, ..., 201-M For purposes of description, planar wavefront 100 is an acoustic wavefront propagating in a seawater environment and sensor array 200 is an underwater acoustical sensor array. However, it is to be understood that the present invention can be used to simulate a planar wavefront for sensor arrays operating in a variety of mediums over a variety of frequency bands. Thus, the present invention can simulate the input to any multisensor measurement system as long as the spacing between the sensors and the speed of wave propagation within the medium are known.

As mentioned above, the acoustic sources generating the acoustic wavefront are generally at a sufficient distance from sensor array 200 such that the wavefront 100 incident upon the array may be considered planar. Planar wavefront 100 thus forms an angle of incidence $\theta$ with each sensor 201-1, 201-2, ..., 201-M in sensor array 200. Thus, for angles of $0° < \theta < 90°$, sensor 201-1 detects the planar wavefront 100 first and is therefore used as the reference sensor. For angles of $90° < \theta < 180°$, sensor 201-M detects the planar wavefront 100 first and as such, is the reference sensor. In either case, each successive sensor in array 200 receives planar wavefront 100 delayed by an amount of time $T_m$, m=1 to (M−1). Time delay $T_m$ is the extra time it takes planar wavefront 100 to travel the extra distance $L_m$ associated with the m-the sensor where $$L_m = md (\sin \theta) \quad (1)$$

and $$T_m = \frac{L_m}{c} \quad (2)$$

where d is the spacing between any two adjacent sensors in sensor array 200 and c is the speed of wave propagation in the medium (i.e., for the case at hand, the speed of sound in water)

Figure 2:
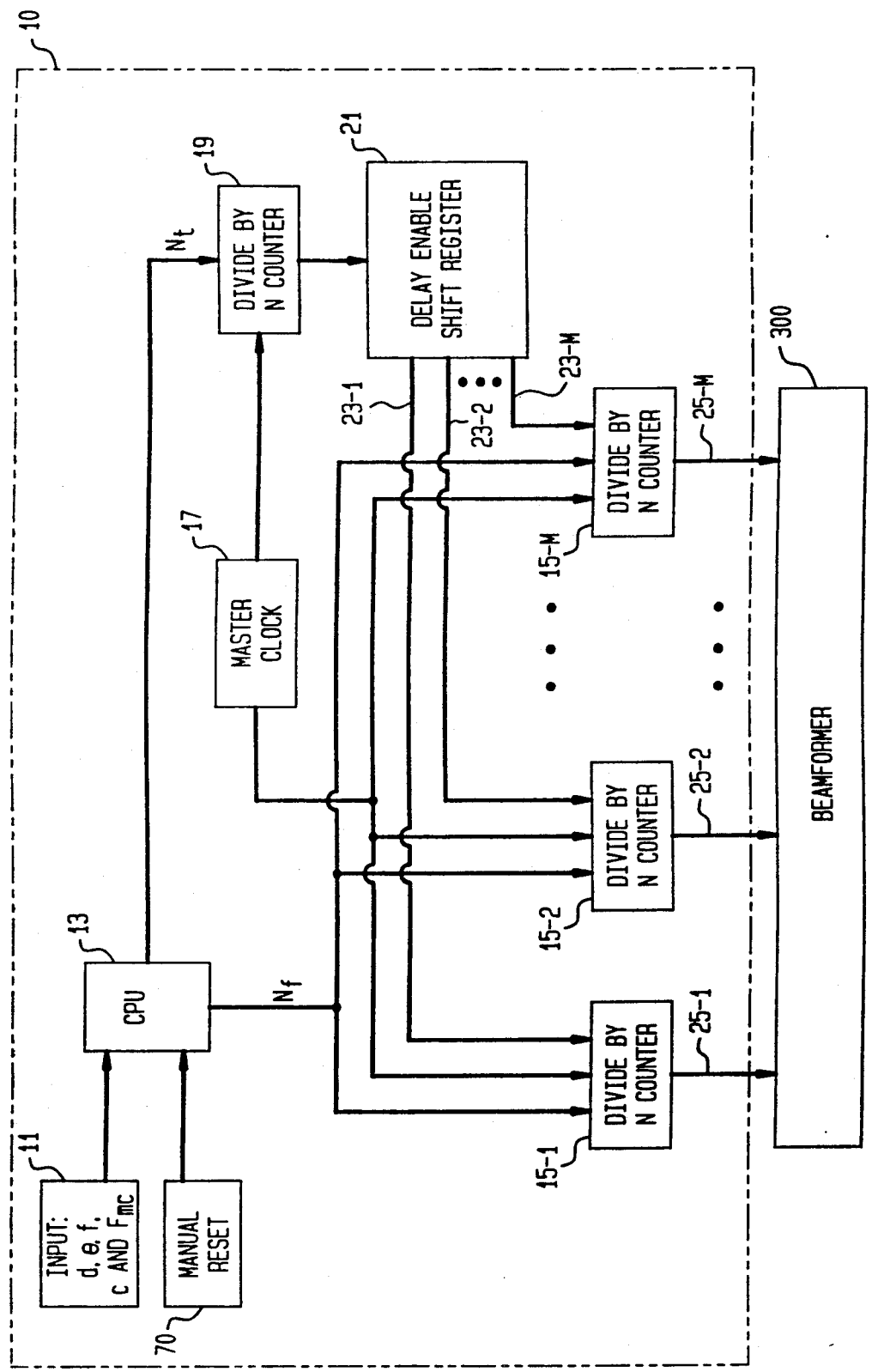

Since the spacing d between each sensor is equal, the extra distance planar wavefront 100 travels (or $L_m$) is incrementally based on the number of sensors in sensor array 200. Accordingly, the time delay $T_m$ between sensors is also incrementally based. With this in mind, the planar wavefront simulator 10 of the present invention will now be explained in conjunction with the block diagram of FIG. 2. Simulator 10 produces a set of M outputs 25-1, 25-2, ..., 25-M that simulate the outputs of an imaginary linear array having M equally spaced apart sensors. The outputs will be representative of a planar wavefront of known frequency f incident on the array at a known angle $\theta$. Thus, outputs 25-1, 25-2, ..., 25-M can be input to a measuring system such as a beamformer 300 in order to test the accuracy of same.

In particular, simulator 10 is configured with means 11 to receive operator supplied inputs:

(1) the spacing d between sensor elements;
(2) the angle of incidence $\theta$;
(3) the frequency of the planar wavefront f;
(4) the wavefront propagation speed c for the particular medium; and
(5) the operating frequency $F_{mc}$ of the simulator's master clock.

The above inputs are fed to a central processing unit (CPU) 13 which may be a single chip microprocessor or a personal computer. The choice of CPU 13 is a design consideration and in no way is a limitation of the present invention CPU 13 receives the operator supplied information and computes an incremental time delay T, a frequency divisor $N_f$ and a time delay divisor $N_t$. Specifically, from equations (1) and (2)

$$T = \frac{d}{c} (\sin\theta), \quad (3)$$

$$N_f = \frac{F_{mc}}{k_1 f}, \quad (4)$$

$$N_t = \frac{F_{mc}}{k_2 T}, \quad (5)$$

where $k_1$ and $k_2$ are constants to be explained further hereinbelow. However, for purposes of an enabling description, it is sufficient that constants $k_1 = k_2 = 1$.

Frequency divisor $N_f$ is supplied to each one of M divide-by-N counters 15-1, 15-2, ..., 15-M. A simulator master clock 17 is provided to supply its clock signal to each one of the counters 15-1, 15-2, ..., 15-M. At the same time, time delay divisor $N_t$ and the clock signal from master clock 17 are supplied to a single divide-by-N counter 19. It should be noted that the choice of a particular divide-by-N counter is a design consideration and not a limitation of the present invention. The key aspects of the divide-by-N counter will be explained further hereinbelow.

Counter 19 generates a pulse every T seconds based on the frequency $F_{mc}$ of master clock 17 and the value of the time delay divisor $N_t$, where T is the incremental time delay for the given spacing d, angle of incidence $\theta$ and wave propagation speed c in the medium being simulated. Each pulse is supplied to a delay enable shift register 21. Shift register 21 is provided with M output enable lines 23-1, 23-2, ..., 23-M, each of which is successively set to HIGH state for each pulse from counter 19. Once set HIGH, each enable line remains that way until a reset of simulator 10 occurs, at which point all enable lines are returned to a LOW state. A reset of simulator 10 may be triggered, for example, by new operator supplied inputs or, alternatively, by a manual reset button 70. Each enable line 23-1, 23-2, . . . , 23-M is connected to a corresponding one of counters 15-1, 15-2, . . . , 15-M.

In operation, an operator supplies the inputs as described above and CPU 13 calculates frequency divisor $N_f$ and time delay divisor $N_t$. Frequency divisor is $N_f$ is used as the JAM input for each counter 15-1, 15-2, . . . , 15-M to force the output of each counter to be the desired frequency of operation f using the master clock frequency $F_{mc}$. Each of the resulting "frequency generators" (i.e., counters 15-1, 15-2, . . . , 15-M) is synchronized to a single master clock so that the output of each generator is perfectly matched in the time domain. As seen by beamformer 300, each sensor element is thus receiving the identical signal except that each sensor element receives it at a different time. Multiple frequency generators are required because the output of each is differentiated from the other outputs by a selected relative time delay. (Note that if the time delay was zero, each frequency generator output would cross the zero time axis simultaneously.)

Time delay divisor $N_t$ is used as the JAM input for counter 19 to force an output pulse from counter 19 every T seconds using the same master clock frequency $F_{mc}$. This is accomplished as counter 19 divides down according to the master clock frequency $F_{mc}$. The first output pulse from counter 19 (after a reset) sets enable line 23-1 to a HIGH state. The second output pulse sets enable line 23-2 to a HIGH state. This process continues for each successive enable line through enable line 23-M. As each successive enable line is set HIGH, the corresponding counter 15-1, 15-2, . . . , 15-M outputs a continuous signal at the selected wavefront frequency f. Since each of the enable lines 23-1, 23-2, . . . , 23-M are set HIGH T seconds apart, the frequency signal output from each output channel 25-1, 25-2, . . . , 25-M, is also delayed by T seconds before being continuously generated. This is equivalent to the delay each sensor would encounter if the planar wavefront was incident at the selected angle $\theta$.

As will be readily apparent to one skilled in the art, the choice of the specific components for simulator 10 may be balanced between specific design needs and cost requirements without departing form the scope of the present invention. For example, while the present invention has been described for divide-by-N counters whose constants $k_1$ and $k_2$ are equal to 1, there may exist other counters whose operations require the values of $k_1$ and $k_2$ to be different than 1. Similarly, the choice of input means 11 and CPU 13 could range from an input keypad and on-board microprocessor combination to a high-speed personal computer that could simultaneously monitor the output of the beamformer being tested.

The advantages of the present invention are numerous. A CPU is used to electrically produce incremental time delays which simulate those experienced by an imaginary linear array in the path of a planar wavefront. In this way, an electronic beamforming apparatus can be efficiently tested in a laboratory environment thereby removing the need for extensive (and costly) field testing of the beamformers. The apparatus uses a plurality of divide-by-N counters in conjunction with a single master clock to generate the operator selected frequencies and time delays. Thus, the system may be easily modified for different frequency ranges by simply changing the operating frequency of the master clock. Furthermore, by permitting the operator to select the frequency of the wavefront, its angle of incidence, spacing between (imaginary) sensor elements, and the simulation medium (via wave propagation speed), a wide variety of multisensor beamforming apparatus may be efficiently tested. Finally, selection of system components may be such that the device could be made portable to serve as a field test/calibration tool. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for simulating a planar wavefront as it would be received by an imaginary linear array of M equally spaced receiving elements sensitive to the wavefront, the wavefront being simulated to propagate at a known frequency through a medium and to be incident upon the imaginary linear array at a known angle of incidence, said apparatus comprising:

a master clock for generating a clock signal at a selected frequency;

means for generating a frequency divisor and time delay divisor based upon the selected frequency of said master clock, the spacing between the receiving elements, the known frequency of propagation, the known angle of incidence, and wavefront propagation speed in the medium;

a plurality of M frequency generation counters, each of which is connected to receive said master clock signal and the frequency divisor;

a time delay counter connected to receive said master clock signal and the time delay divisor and for generating a pulse every T seconds, where T is equal to the time difference associated with receiving the planar wavefront at any two adjacent receiving elements of the imaginary linear array for the known angle of incidence; and a delay enable shift register connected to said time delay counter for receiving the generated pulse every T seconds, said shift register further having M enable lines as output lines wherein each successive one of said M enable lines is set HIGH in response to the generated pulse, and wherein each one of said M enable lines is connected to a corresponding one of said M frequency generation counters whereby a signal is generated at the known frequency of propagation at each one of the corresponding M frequency generation counters when its enable line is set HIGH, the generated signal being based on the selected frequency of said master clock and the frequency divisor.

2. An apparatus as in claim 1 wherein each of said M frequency generation counters and said time delay counter comprises a divide-by-N counter.

3. An apparatus as in claim 1 further comprising means for selecting the spacing between the receiving elements, frequency of propagation, angle of incidence, and wavefront propagation speed in the medium.

4. An apparatus for simulating a planar wavefront as it would be received by an imaginary linear array of M equally spaced receiving elements sensitive to the wavefront, wherein adjacent receiving elements of the imaginary linear array are separated by a selected distance d, the wavefront being simulated to propagate at a selected frequency f through a particular medium and to be incident upon the imaginary linear array at a selected angle of incidence $\theta$, said apparatus comprising:

a master clock for generating a clock signal at a selected frequency f;

means for generating a frequency divisor $N_f$ and time delay divisor $N_t$ based upon the selected frequency of said master clock, the spacing between the receiving elements, the selected frequency of propagation, the selected angle of incidence, and wavefront propagation speed c in the particular medium;

a plurality of M frequency generation counters, each of which is connected to receive said master clock signal and the frequency divisor $N_f$;

a time delay counter connected to receive said master clock signal and the time delay divisor $N_t$ and for generating a pulse every T seconds, where T is equal to the time difference associated with receiving the planar wavefront at any two adjacent receiving elements of the imaginary linear array for the selected angle of incidence; and a delay enable shift register connected to said time delay counter for receiving the generated pulse every T seconds, said shift register further having M enable lines as output lines wherein each successive one of said M enable lines is set HIGH in response to the generated pulse, and wherein each one of said M enable lines is connected to a corresponding one of said M frequency generation counters whereby a signal is generated at the selected frequency of propagation at each one of the corresponding M frequency generation counters when its enable line is set HIGH, the generated signal being based on the selected frequency of said master clock and the frequency divisor.

5. An apparatus as in claim 4 wherein each of said M frequency generation counters and said time delay counter comprises a divide-by-N counter.

6. An apparatus as in claim 5 wherein said generating means comprises a microprocessor for generating the frequency divisor $N_f$ according to the relationship $$\frac{F_{mc}}{k_1 f}$$

and for generating the time delay divisor $N_t$ according to the relationship $$\frac{F_{mc}}{k_2 T}$$

where T is equal to $$\frac{d}{c} \sin\theta$$

and wherein $k_1$ and $k_2$ are constants based on said divide-by-N counter.

* * * * *